United States Patent [19]

De Bey

[11] Patent Number: 5,421,031
[45] Date of Patent: May 30, 1995

[54] PROGRAM TRANSMISSION OPTIMISATION

[75] Inventor: Henry C. De Bey, Perth, Australia

[73] Assignee: Delta Beta Pty. Ltd., Fremantle, Australia

[21] Appl. No.: 173,865

[22] Filed: Dec. 23, 1993

Related U.S. Application Data

[63] Continuation of Ser. No. 835,947, Apr. 2, 1992, abandoned.

[30] Foreign Application Priority Data

Aug. 23, 1989 [AU] Australia .................. PJ5933

[51] Int. Cl.⁶ .................................. H04H 1/02
[52] U.S. Cl. ......................... 455/5.1; 455/6.1; 348/7; 348/12
[58] Field of Search ............. 348/6, 7, 8, 10, 12, 348/17, 13; 455/3.1, 4.1, 4.2, 5.1, 6.1, 6.3, 6.2

[56] References Cited

U.S. PATENT DOCUMENTS

| | | | |
|---|---|---|---|
| 4,028,733 | 6/1977 | Ulicki | 358/86 |
| 4,506,387 | 3/1985 | Walter | 455/6.1 |
| 4,593,318 | 6/1986 | Eng et al. | |
| 4,821,101 | 4/1989 | Short | |
| 4,847,690 | 7/1989 | Perkins | |
| 4,849,817 | 7/1989 | Short | |
| 4,887,152 | 12/1989 | Matsuzaki et al. | |

FOREIGN PATENT DOCUMENTS 0343930 11/1989 European Pat. Off.

Primary Examiner—Reinhard J. Eisenzopf
Assistant Examiner—Nguyen Vo
Attorney, Agent, or Firm—Stevens, Davis, Miller & Mosher

[57] ABSTRACT

A system and method of optimizing transmission of a program to multiple users over a distribution system, with particular application to video-on-demand for a CATV network. The system includes, at a head end of the CATV network a scheduling and routing computer for dividing the video program stored in long term fast storage or short term fast storage into a plurality of program segments, and a subscriber distribution node for transmitting the program segments in a redundant sequence in accordance with a scheduling algorithm. At a receiver of the CATV network there is provided a buffer memory for storing the transmitted video program segments for subsequent playback whereby, in use, the scheduling algorithm can ensure that a user's receiver will receive all of the program segments in a manner that will enable continuous playback in real time of the program. Under the control of controller the receiver distinguishes received program segments by a segment identifier so that redundant segments captured in capture memory are then stored in buffer memory from which the segments can be retrieved and decompressed in data decompressor for immediate or subsequent viewing.

24 Claims, 6 Drawing Sheets

PROGRAM TRANSMISSION OPTIMISATION

This application is a Continuation of application Ser. No. 07/835,947, filed Apr. 2, 1992, now abandoned.

FIELD OF THE INVENTION

The present invention relates to a system and method for program transmission optimisation over a distribution system and relates particularly, though not exclusively, to such a method and system for supplying video-on-demand over a cable television network.

DISCUSSION OF THE PRIOR ART

Throughout the following specification the word "program" should be understood in the broadest sense of the term and includes any information, whether visual or audible, a mixture of both or otherwise, which is normally perceived in a substantially continuous sequence of impressions through one or more of the human senses. The term "video program" refers to a program of visual information or visual and audible information, whether recorded in reproducible format or transmitted "live". In our "information society", with its increasing emphasis on greater accessibility to information, there are many situations where the same program may be required to be accessed by more than one person at the same time.

Thus, for example, in a library of a large educational institution which stores lectures and other information on audio and/or video cassettes, the demand for certain programs may be particularly high at certain times and there is a need to be able to allow several students to listen to or view the program simultaneously from the beginning, without having to force individuals to start listening to or viewing the program at the same time. Ideally, it should be possible to service the needs of all persons requiring that program immediately when it is requested. In practice this is extremely difficult without expensive duplication of equipment and complex electronic processing. Another example of this type of multiple user situation is so called video-on-demand television. A video-on-demand system ideally allows any subscriber to request (demand) any particular video program at any time of the day.

A prior art video-on-demand system is described in U.S. Pat. No. 4,506,387 to Walter in which each video program is pre-programmed in a memory device selectable by a hose computer at a central data station in response to an address signal transmitted from the user. The host computer controls the transmission of the video program at a high non-real-time rate over a fibre optic line network to a data receiving station at the users location. The data receiving station then converts the received optical data to electrical data and stores it for subsequent real-time transmission to the users television set.

There are a number of significant disadvantages with the system of Walter, the foremost being that it is incompatible with existing television transmission networks and in particular CATV coaxial cable networks. In order to achieve a rapid response time Walter transmits all of the digital data corresponding to an entire program to the receiving station over a plurality of fibre optic lines within a very short time. Even with compression of the digital data the bandwidth requirement for this system is relatively large. For example, sixteen (16) optical data channels over four fibre optic lines are required to transmit a two hour movie in about thirty one seconds. Very few homes or buildings currently have ready access to a fibre optic cable, and a fibre optic network is expensive to install.

A further disadvantage with the system of Walter is that it cannot adequately handle a high demand for the same video program. Research in video tape lending libraries indicates that out of a total of say five thousand tapes held in the library, at any one time only a core group of twenty to forty most popular titles are in high demand. Furthermore, this research into the viewing habits of viewers indicates that the core video demand requirement varies throughout the day as the nature of the-viewers changes. Whilst Walter contemplates that the central data station may transmit only a portion of the selected program to the user for his viewing, and then begin transmitting a portion of another selected program to a second user, the system cannot simultaneously handle several users requesting the same program. In that event, a user must wait until transmission of the entire program to each user who placed a request prior to his own has been completed, before the system can attend to his demand. Clearly with core video programs this could result in unacceptable delays.

SUMMARY OF THE INVENTION

The present invention was developed with a view to providing a method and system for program transmission optimisation over a distribution system for multiple users, and was developed specifically, though not exclusively, with a view to providing a system and method for supplying video-on-demand which is compatible with existing video distribution systems such as CATV. Throughout this specification the term "distribution system" is to be construed in the broadest sense of the term and covers ordinary radio and television networks, CATV and internal television/video/audio distribution systems of the kind employed in hotels, educational institutions and more recently in aircraft and ocean liners.

According to one aspect of the present invention there is provided a method for optimising transmission of a program Go multiple users over a distribution system, the method comprising:

at a head end of the distribution system,
dividing the program into a plurality of program segments; and,
transmitting the program segments in a redundant sequence in accordance with a scheduling algorithm;

and at a receiver of the distribution system,
storing the transmitted program segments in a buffer storage means in the receiver for subsequent playback whereby, in use, said scheduling algorithm can ensure that a user's receiver will receive all of the program segments in a manner that will enable continuous playback in real time of the program.

Preferably the method further comprises selecting a Maximum Response Time (MRT) corresponding to a maximum time a user need wait to commence playing a requested program.

Typically the seep of dividing the program involves dividing the program into segments of a length selected such that at lease one segment can be transmitted in the time of one MRT.

In the preferred embodiment said step of transmitting the segments involves transmitting one or more segments during each MRT, including a first segment corresponding to a first segment of playing time of the program, in accordance with the scheduling algorithm whereby, in use, the first segment is always available at a receiver within one MRT for immediate playback.

According to another aspect of the present invention there is provided a system for optimising transmission of a program to multiple users, the system comprising:

at a head end of the system:
  means for dividing the program into a plurality of program segments; and,
  means for transmitting the program segments in a redundant sequence in accordance with a scheduling algorithm;
and at a receiver of the system,
  buffer storage means for storing the transmitted program segments for subsequent playback on the receiver whereby, in use, said scheduling algorithm can ensure that the receiver will receive all of the program segments in a manner that will enable continuous playback in real time of the program at the receiver.

Preferably the system further comprises at the head end of the system:
  means for numbering the program segments 1 to n, where n equals the number of segments into which the program is divided, and wherein the segments are numbered in the order in which they should appear in the program for normal playback.

According to a further aspect of the present invention there is provided a receiver for receiving a program supplied by a program transmission optimisation system, the receiver comprising:
  buffer storage means for storing a plurality program segments of the program transmitted from a head end of the system according no a scheduling algorithm; and,
  processing means for processing said program segments stored in the buffer storage means and supplying the segments in the correct sequence for playback whereby, in use said scheduling algorithm can ensure that the receiver will receive all of the program segments in a manner that will enable continuous playback in real time of the program at the receiver.

Typically said processing means comprises means for distinguishing received program segments by a segment identifier, wherein said segment identifier at least identifies a segment by its number whereby, in use, the receiver can distinguish redundant segments from segments required for subsequent playback.

According to a still further aspect of the present invention there is provided a scheduling apparatus for a program transmission optimisation system, the apparatus comprising:
  means for dividing the program into a plurality of program segments;
  means for scheduling said plurality of program segments in a redundant sequence in accordance with a scheduling algorithm: and,
  means for routing said scheduled program segments for transmission to one or more receivers of users requesting the program whereby, in use, said scheduling algorithm can ensure that a user's receiver will receive all of the program segments in a manner that Will enable continuous playback in real time of the program.

Preferably said means for dividing divides the program into segments of a length selected such that at least one segment can be transmitted in a Maximum Response Time (MRT) time interval, wherein MRT corresponds to a maximum time a user need wait to commence playing a requested program from its beginning.

The scheduling algorithm preferably employed in the invention involves iteratively calculating during each MRT the result of COUNT Modulo $X=Y$, wherein COUNT=a predetermined initial whole number incremented by 1 each MRT, $X=1$ to n, where n=the number of segments into which the program has been divided, whereby, in use, wherever $Y=0$ the program segment number X will be transmitted.

BRIEF DESCRIPTION OF DRAWINGS

In order to facilitate a better understanding of the nature of the invention a detailed description of one preferred embodiment of a program transmission optimisation system and method in the form of a video-on-demand system and method will now be given, by way of example only, with reference to the accompanying drawings, in which.

DETAILED DESCRIPTION OF A PREFERRED EMBODIMENT

Figure 1:
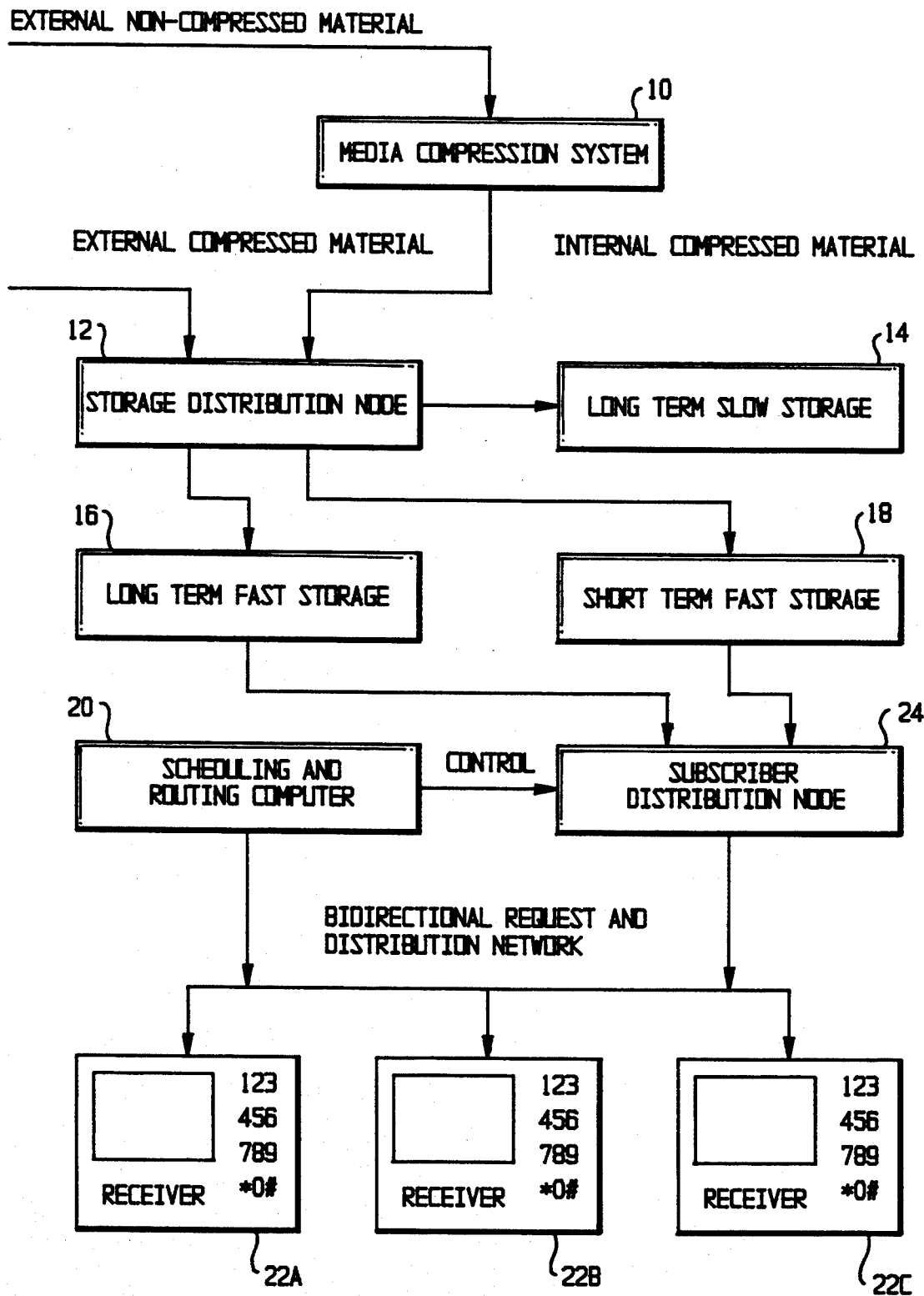
FIG. 1 is a schematic diagram of a preferred embodiment of a video-on-demand system.

FIG. 1 illustrates schematically a preferred embodiment of the video-on-demand system according to the present invention. Referring to FIG. 1, external non-compressed material can enter the system in its most basic format such as 35 mm film, video tape, or through a telecommunications link such as broadcast television or satellite transmission. The non-compressed material is passed through a media compression system 10 for compressing the audio visual program material into a compressed format. The audio visual program material may be compressed by an external video compression service provider such as Intel Corporation. Such external compressed material may enter the system directly via a storage distribution node 12. The storage distribution node 12 routes the compressed video material to the appropriate storage medium.

There are three types of storage in the system, long term slow storage 14, long term fast storage 16 and short term fast storage 18. The division of the storage of compressed video material into the different types of storage is based on commercial considerations, in view of the relatively high cost of fast storage media compared to slow storage media. The selection of the type of storage to which different programs would be routed is based upon the expected future demand for the video material concerned. Daily news segments would probably be stored in short term fast storage 16, whereas a movie classic such as "Gone With The Wind" would probably be stored in long term fast storage 16. Infrequently requested materials such as some obscure silent movie would probably be stored in long term slow storage 14. The storage distribution node 12 is typically a micro or mini computer which controls the flow of data between the different storage devices.

The long term slow storage 14 typically takes the form of storage media such as magnetic tapes, or optical discs and may require human intervention for retrieval of infrequently accessed program material. The long term fast storage 16 may typically take the form of a jukebox type of optical disc storage device. Optical disc storage provides high density storage with random access, and the jukebox access mechanism provides automatic program access. A typical unit currently available is the KODAK Optical Disc System 6800 drive/cabinet. The short term fast storage 18 may take the form of a magnetic disc drive such as an IBM Model 3380. This allows rapid random access to the compressed video material stored in digital format, but is a relatively expensive storage medium and would therefore only be used for storing popular core video programs.

The scheduling and routing computer 20 receives requests for specific audio visual material from user's receivers 22A, 22B or 22C via a bi-directional request and distribution network. The scheduling and routing computer 20 controls the retrieval and division of the selected video program in a plurality of video segments, schedules the video segments in accordance with a scheduling algorithm and controls the routing of the scheduled segments for transmission to one or more of the receivers 22A, 22B or 22C, so that each requesting viewer's receiver will receive all of the video segments in a manner that will enable continuous immediate viewing of the program. The video-on-demand system employs a combination of frequency multiplexing and time division multiplexing. The time division multiplexing of the video segments is controlled by the scheduling and routing computer 20 in accordance with the scheduling algorithm. The frequency multiplexing is performed by a subscriber distribution node 24 under the control of the scheduling and routing computer 20. The processing capabilities of the scheduling and routing computer 20 are similar to that required by computers used by banks for automatic teller machines. The scheduling and routing computer 20 may be any suitable computer with a typical processing capability of 1.5 to 200 million instructions per second (MIPS), depending on the size of the subscriber base and other loading factors.

The viewer's receivers 22 are typically frequency agile to be compatible with the frequency multiplexing employed at the head end of the system. The receivers are provided with processing means to capture the appropriate data packets created by the time division multiplexing of the video segments. The receivers 22 are also provided with buffer storage means for storing the received video segments, and would typically also comprise decompression means for decompressing the video data for subsequent display on a dedicated television screen, or fed into a conventional television set.

The video-on-demand system of FIG. 1 can operate on either analog or digital communication circuits, however in the preferred embodiment described below the video distribution system is a conventional cable television system which is analog. In the preferred embodiment of the system described below primarily modulated digital data is transmitted over the CATV network. However, it is envisaged that a future system will employ a mixture of analog and modulated digital signals.

The method of program transmission optimisation according to the invention can provide transmission optimisation for either digital or analog information signals.

Conventional CATV systems are typically simplex communication systems (one way only) so that there is no easy way to retransmit data when errors are detected. Accordingly, some form of error compensation is required. Fortunately, television data is generally used in a very transient manner, unlike computer data that must be assured of accurate transmission. If a few frames of a TV image are disturbed most viewers accept this without even a conscious acknowledgment of their occurrence. Accordingly, a much higher bit error rate can be tolerated, for example 1 erroneous data bit per 100,000. At this rate the human eye/brain system normally cannot even detect the video effects caused by this erroneous bit. Most digital modems work with bit error rates of 1 in 100,000,000 to 1 in 1,000,000,000! Therefore, the video-on-demand system can tolerate error rates typically from 1,000 to 10,000 times higher than most computer data systems are presently designed for. A higher error rate will of course improve performance, although the improvement may be imperceptible to a viewer.

Figure 2:
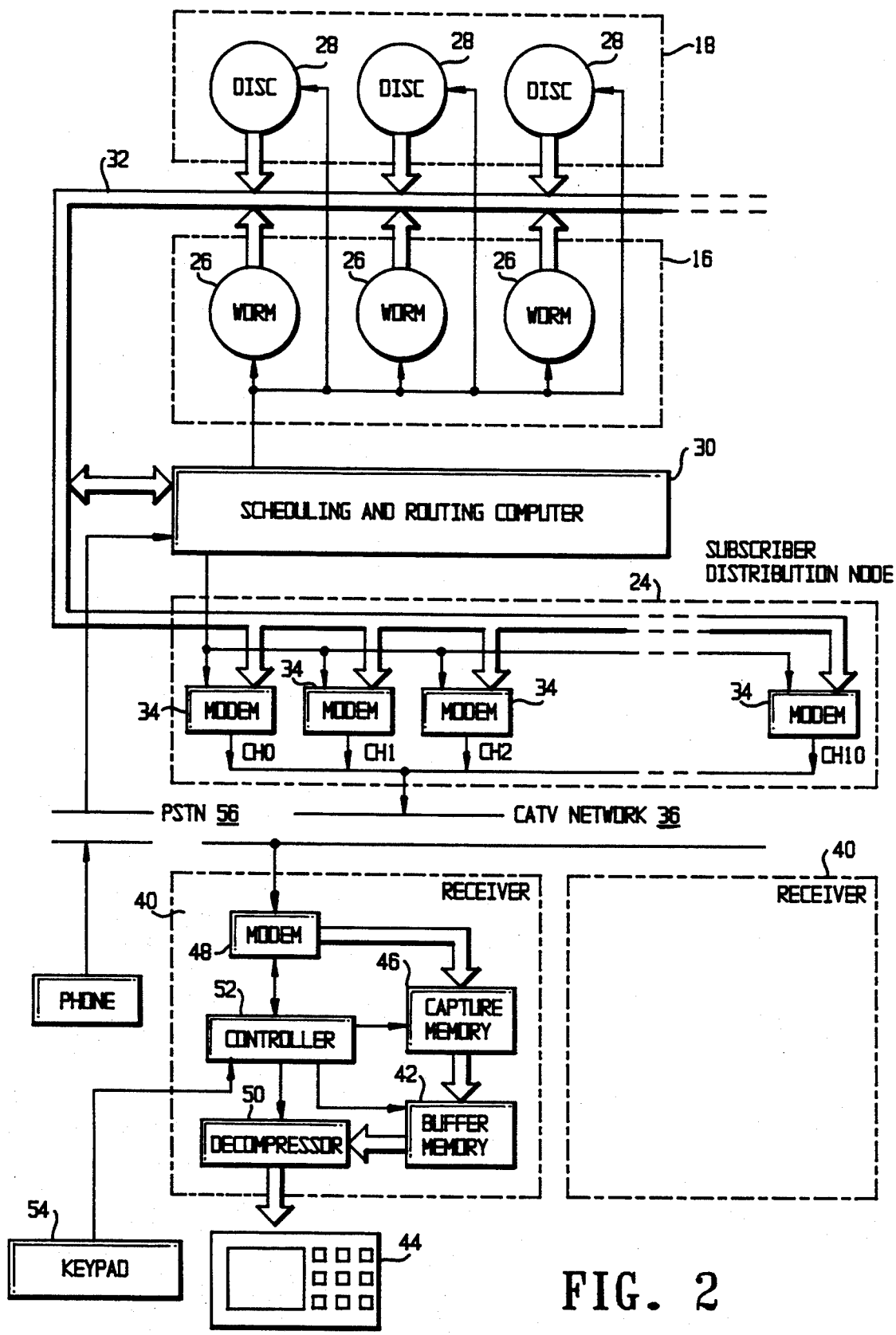
FIG. 2 is a more detailed block diagram illustrating the functional blocks of the video-on-demand system in FIG. 1 applied to a CATV network.

FIG. 2 illustrates in block diagram form a preferred embodiment of the video-on-demand system applied to a CATV network. The video demand system comprises at the head end means for providing a video program in a compressed format in the form of Write Once Read Many (WORM) storage devices and magnetic disc storage devices 28 providing long term fast storage 16 and short term fast storage 18 respectively. In this particular embodiment the compressed video material is stored in digital format in the storage devices and the video programs may already be segmented in the storage media in video packets sized to be compatible with the system specifications. The magnetic disc devices 28 and WORM devices 26 are connected to a scheduling and routing computer 30 by data bus 32.

The scheduling and routing computer 30 responds to a subscriber request for a particular program by retrieving the video program from the appropriate storage media and dividing the video program into a plurality of video segments. As mentioned above, the video program may be stored in the storage media already in segments corresponding to the scheduling requirements of the system thereby reducing the load on the computer 30 during the process of retrieving and dividing the video program into video segments. The computer 30 then schedules the plurality of video segments of the video program in accordance with a scheduling algorithm, as will be described in more detail below, and routes the scheduled video segments for transmission to one or more receivers of viewers requesting the video program. For core video programs (those that are in continuous demand by at least one subscriber for periods of more than one Video Playing Time (VPT)), the scheduling algorithm can be run once and the packets stored in the scheduled sequence on a serial recording device such as a tape drive (not shown), to further reduce loading on the computer.

In this embodiment the subscriber distribution node 24 comprises a plurality of modems 34 under the control of the scheduling and routing computer 30. Each modem 34 modulates a different carrier frequency signal, corresponding to each of the channels on the CATV network 36, for transmitting the video segment data packets routed to the appropriate modem 34 by the scheduling and routing computer 30 over data bus 32.

Each subscriber on the CATV network 36 is provided with a receiver 40 for receiving the video segment data packets corresponding to the requested program and storing the video segments for future viewing by the subscriber. Each receiver 40 typically comprises a buffer memory 42 for storing the video segments of the video program transmitted from the head end, and video processing means for processing the video segments stored in the buffer memory and supplying the segments in the correct sequence to a subscriber television set 44 for viewing. Typically the video processing means may include a controller 52 and a capture memory 46 for capturing the video segment data packets received over the CATV network 36 and demodulated by one or more modems 48 of the receiver. Under the control of controller 52 the video processing means distinguishes received program segments by a segment identifier, for example the PKT ID, so that redundant segments can be ignored and overwritten in capture memory 46. Modem 48 is preferably a frequency agile broad band modem such as the Fairchild M505, although as noted above a more low level digital modem with lower bit error rate can also be employed. Compressed video data packets captured in capture memory 46 are stored in buffer memory 42 from which the segments can be retreived and decompressed in data decompressor 50 for immediate or subsequent viewing. The microprocessor based controller 52 controls the flow of data and the video processing within the receiver 40.

Some CATV systems can accommodate bidirectional decoders or receivers, and for this type of system the receiver 40 is provided with a key pad 54 to enable the subscriber to initiate a request via the CATV network 36. However, the majority of CATV systems are unidirectional (simplex) and a subscriber request must therefore be made over the public switched telephone network (PSTN) 56. The subscriber request via the PSTN 56 may be verbal or via touch tone keying similar to that provided by other on-line subscriber network service providers.

Security on the system to prevent unauthorised viewing of transmitted programs may be implemented in several ways. Standard encryption algorithms could be applied at the modems 34 prior to transmission. Each receiver 40 would then require a key to decrypt the received data. Encryption/decryption keys are distributed to subscribers in a similar manner to that employed by financial institutions to distribute PINs for automatic teller machine usage. Alternatively, each data packet transmitted at the head end can be prefixed with a receiver ID unique to each subscriber so that a pirate receiver would need to select the appropriate receiver ID in order to receive a particular video program.

It will be appreciated that the video-on-demand system illustrated in FIG. 2 is exemplary only, and than many other hardware implementations could be employed to effect the method and system for supplying video-on-demand according to the invention. For example, the receivers 40 may comprise several modems for simultaneously receiving data packets over several channels, and the capture memory may be dispensed with if the video segments are stored in the buffer memory in compressed format. The video segments are then decompressed when they are provided to the subscriber's television set in the correct sequence for viewing. Furthermore, certain sections of the head end apparatus or of the receiver may be located at different geographical locations. For example, in view of the typical architecture of CATV systems, it is possible that the modem and buffer sections of the receiver will become part of the cable network in what is referred to as a subscriber tap, and that the other sections would be located at the subscriber's premises.

It should be noted that the video segment data packets for a particular program need not be transmitted over the same channel for all viewing subscribers. By employing a combination of time division multiplexing and multiple channels at the head end of the system, data rates over each of the channels can be kept at a minimum therefore allowing the use of less expensive hardware at the receivers. Each receiver 40 may be configured to scan the channels in a cyclic fashion in order to determine which channel or channels the appropriate video segments are being transmitted. In addition to this a dedicated control channel can be provided over which data from the scheduling and routing computer 30 is transmitted to instruct each receiver as to which packets to receive and on which channel(s). However, preferably the head end transmits the video segments in accordance with the scheduling algorithm in a continuous manner, with each video segment provided with a title ID as well as a segment ID, so that each receiver will receive all of the video segments with the appropriate title ID and can discard or overwrite the video segments already received.

A key feature of the present invention is the scheduling of the video segments for transmission in a redundant sequence in a manner that will ensure that each receiver will receive all of the video segments for the requested program according to a schedule that will enable continuous playback in real time of the video program at the receiver. A preferred form of an efficient scheduling algorithm and its implementation will now be described in detail.

In the following description the term "Maximum Response Time" (MRT) refers to the maximum time a subscriber will need to wait before the video program requested will be available for viewing at his receiver. MRT refers to the maximum time that the system has to respond to the demand. Video Play Time (VPT) refers to the time required to play the particular video program when viewed at normal play back speed. The data that comprises the video program must be divided into video segment data packets of such a length that one packet can be transmitted in the time of 1 MRT. The video segment play back time or slot length of one data packet need not be less than 1 MRT and may be longer than 1 MRT depending on how much band width is available over the transmission medium for transmitting the data packet(s) in the time of 1 MRT. The slot length may be variable in order to adjust the instantaneous loading and data rates on the transmission medium or to adjust the amount of buffer storage space required in the receivers. However, in any one installation, the slot length and MRT would normally be fixed for a specific system configuration. In the following description the slot length has been made equal to the MRT in order to simplify explanation. Thus, for example, if the video program is 60 minutes long and the MRT is 5 minutes, the video program is divided into 12 discreet data packets each corresponding to 5 minutes of video segment data. Each of the data packets is numbered from 1 to n where n equals VPT/MRT, in chronological viewing order.

Implementation of the scheduling algorithm is Preferably under software controlled by the scheduling and routing computer 30. The basic flow of the scheduling program is as follows:

```
         set MRT equal to chosen maximum response time
         set a counter equal to 0 an initial value
         retrieve video segment data packets sized to relate
         to a play time of MRT (PKT1, PKT2 ... PKTn).
loop     wait for remainder of period equal to MRT
         set COUNT equal to COUNT plus 1
         if (COUNT Modulo 1) = 0 then transmit PKT1
         if (COUNT Modulo 2) = 0 then transmit PKT2
         if (COUNT Modulo 3) = 0 then transmit PKT3
         ...
         ...
         ...
         if (COUNT Modulo n) = 0 then transmit PKTn
         start again at loop
```
Note:
(x Modulo y) = the remainder of (x divided by y).

In accordance with the above scheduling algorithm video segment data packets are transmitted in a redundant sequence, with one or more data packers being transmitted during each MRT. Each transmission starts at an incremental time n*MRT, and in many instances a majority of the MRT period is expended in actually accomplishing the transmissions. With the above scheduling algorithm PKT1 will always be transmitted, however the other packets may or may not be transmitted at any given value for COUNT. Hence, any particular requesting receiver may receive the packets in a non-contiguous stream. Thus, for an MRT=5 and a VPT=60 it may receive the packets as follows:

| MRT | PKTs Received | PKTs Viewed |
|---|---|---|
| 1 | PKT1 AND PKT3 | PKT1 VIEWED |
| 2 | PKT2 | PKT2 VIEWED |
| 3 | PKT4 AND PKT8 AND PKT12 | PKT3 VIEWED |
| 4 | NO PACKETS | PKT4 VIEWED |
| 5 | PKT5 AND PKT6 AND PKT7 AND PKT11 | PKT5 VIEWED |
| 6 | NO PACKETS | PKT6 VIEWED |
| 7 | NO PACKETS | PKT7 VIEWED |
| 8 | PKT9 AND PKT10 | PKT8 VIEWED |
| 9 | | PKT9 VIEWED |
| 10 | | PKT10 VIEWED |
| 11 | | PKT11 VIEWED |
| 12 | | PKT12 VIEWED |

Figure 6:
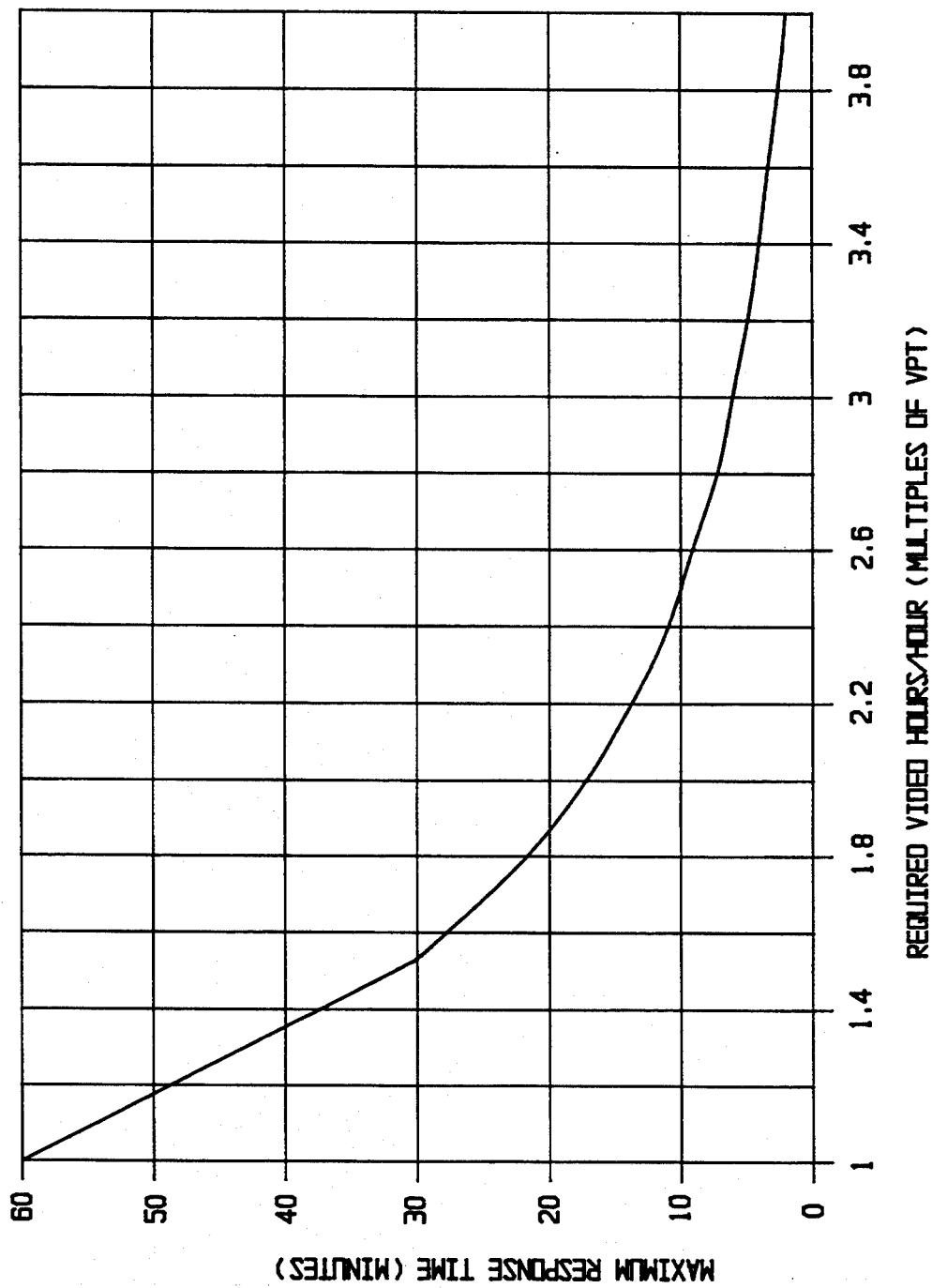

The above sequence is just one of many possible packet delivery sequences produced by the algorithm. FIG. 6 is a graphical representation of the sequence of video segment data packets transmitted during each MRT time interval. The number of each video segment appears on the vertical axis and the number of the MRT interval appears along the horizontal axis. FIG. 6 shows a maximum of 30 video segments and 49 MRT intervals, however obviously these are arbitrary numbers and both axes could be continued indefinitely. There would be a practical limit to the number of video segments that the video program could be divided into, however the number of MRT intervals will be a function of the duration for which a particular program is in continuous demand. From casual observance of the sequence output of the algorithm it would appear to be a random ordering of packets. However, although the sequence may be considered pseudo-random, it is in fact non-random in that it ensures that a receiver never has to wait on any packet to be transmitted and can provide immediate viewing of the video segments in the correct sequence. Accordingly, by the time the receiver is ready to display a particular packet, that packet will either be in the buffer memory, or being received at that time.

In the above table, redundant packets have not been included in the "PKTs received" column since in practice these would be discarded or overwritten by the receiver. In the above sequence example it will be noted that within a time equal to 8 MRTs all 12 packets have been received, and that certain packets, for example PKT12, is received by the receiver well before it is needed for viewing. PKT12 and any other packets received early are held in the buffer until the appropriate time for viewing. The scheduling algorithm ensures that a packet is always received when it is due to be viewed or before.

In FIG. 6, it can be seen that at certain times, for example, MRT intervals 12, 24 and 36 a larger number of packets are received than at other times, which tends to increase the load on the transmission medium and the buffer memory in the receivers. It is preferable that the buffer memory be large enough to store all of the data packets for a particular program, and this also enables the receiver to store the program for later viewing if desired.

The underlying design considerations for the scheduling algorithm and the amount of buffer memory required in the receivers involve trade offs between the response time (MRT) guaranteed to viewers, the bandwidth required for servicing requests, and the amount of buffer storage space provided in the receivers. The principle advantage of a scheduling algorithm of the above kind is the efficient utilisation of the transmitting medium that can be realised. Thus, for example, if an MRT of 5 minutes is required, without the scheduling algorithm the complete video program would need to be transmitted continuously from the beginning every 5 minutes. Thus, for a program with 60 minutes play time the complete program would have to be transmitted 12 times. Using the above scheduling algorithm the number of data packets required to be transmitted to provide an MRT of 5 minutes is equal to having to transmit the entire program only 3.12 times.

The relationship between MRT and the total amount of data that must be transmitted can be represented by the following "best fit curve" equation:

$$\text{TOTAL DATA} = \frac{\text{LOG } (MRT/154.94)}{-0.47782}$$

Total data is in terms of VPT, so that a data amount of 3 is equal to 3 times the VPT or 180 minutes worth of data for a 60 minute program supplied with an MRT of 5 minutes. FIG. 6 is a graphical representation of the relationship between MRT and the required video-hours/hour of transmission time or the total amount of data transmitted.

It will be appreciated that although the above described scheduling algorithm is the preferred form, modifications can be made to the algorithm that would allow trade offs between transmission efficiency and the amount of buffer storage required. Commercial considerations will determine how the balance of system costs are weighted. If more is spent on receiver buffers, then less will be required to be spent on provision of transmission lines.

In an example of a modified scheduling algorithm it is possible to diverge from the requirement of always sending PKT1. In this case, PKT1 and other selected packets may be transmitted less frequently and held in available buffer storage space at the receivers until a request is lodged. For example, the following implementation can be adopted:

Each receiver is provided with low power buffer memory devices which are kept active at all times for receiving selected packets of video programs. Assuming there are, say, 10 core video programs, the receivers can be configured to store PKT1 of each of the 10 core video programs, PKT1 being only transmitted at predetermined intervals in accordance with the modified scheduling algorithm, rather than at each MRT as in the above described scheduling algorithm. Hence, when a request for a core program is lodged, the first packet is already in the receiver buffer memory and can be immediately accessed for viewing while the modified scheduling algorithm is then implemented. This can reduce transmission bandwidth requirements considerably, with a modest increase in receiver cost, while providing instantaneous delivery of the core program to the viewer.

It is also possible to reduce peak transmission loads by diverging from the requirement that all requests start to be serviced within a maximum period equal to MRT. By accepting a small percentage of service delays, it is possible to further smooth the transmission load.

Figure 3:
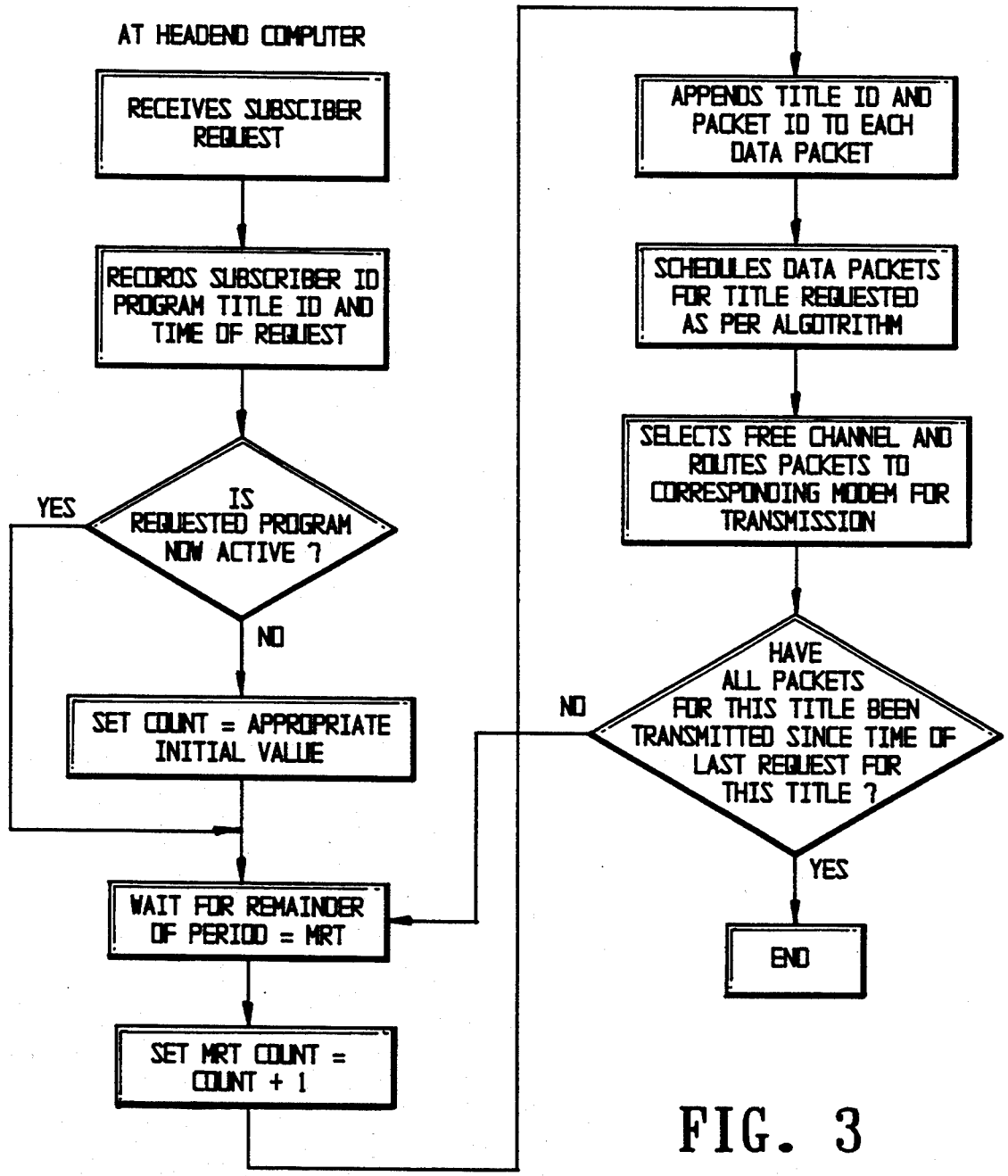
FIG. 3 is a flow chart of the method steps employed at a head end of the video-on-demand system.
Figure 4:
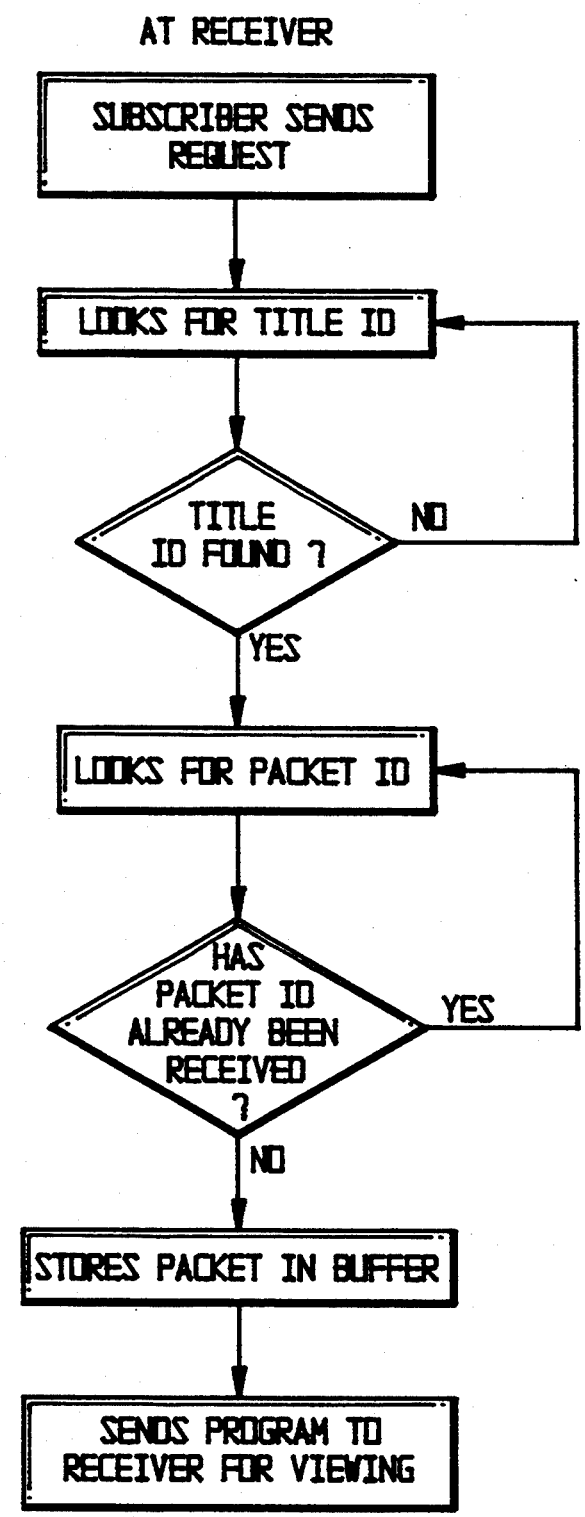
FIG. 4 is a flow chart of the method steps employed at a receiver of the video-on-demand system.
Figure 5:
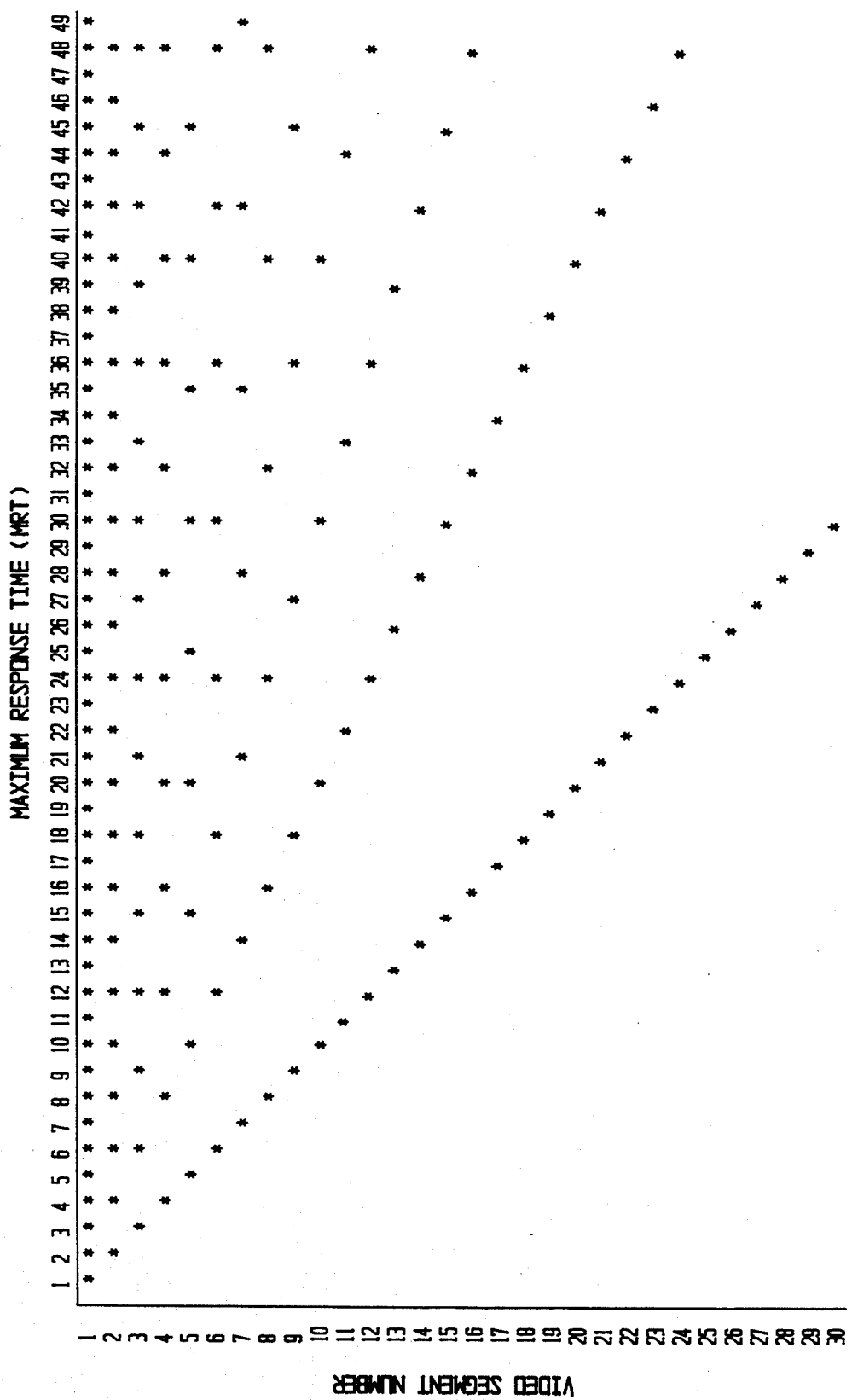
FIG. 5 is a tabular representation of the transmission sequence of video segments in accordance with a preferred scheduling algorithm; and, FIG. 6 is a graphical representation of the relationship between Maximum Response Time and the required video-hours/hour of transmission time.

A typical software control sequence at both the head end computer and at the receiver will now be described with reference to FIGS. 3 and 4. When the head end scheduling and routing computer receives a subscriber request it records the subscriber ID, the requested program title ID and the time of request. The computer tracks each request and its progress towards completion in accordance with the scheduling algorithm. There will normally be several program streams being transmitted an any one time. The scheduling algorithm generates different data rates at different times as noted above. By staggering the entry value of COUNT for different program streams, the total data rate on the transmission medium can be maintained at a fairly constant level. Depending upon the value of COUNT at which a particular request enters the algorithm, the time taken to complete transmission of a requested program may range from 1 MRT to 1 VPT or any value in between.

Hence, when the head end computer has recorded the subscriber ID, title ID and time of request it determines whether the requested program is currently active, and if so enters the scheduling sequence at the conclusion of the current MRT time interval. If the requested program is not currently active then the COUNT value of the computer's internal counter, (may be a software counter) is set to the appropriate initial value to provide a staggering of the entry value of COUNT for each different program stream. Thus, for example, assuming requests are made simultaneously for programs A, B, C and D, service of the four requests can all commence simultaneously. However, program A would enter the algorithm scheduling sequence with COUNT equal to zero, B with COUNT equal to 1, C with COUNT equal to 2 and D with COUNT equal to, 3. Thus, during each MRT time interval different numbers of video segments for each of the programs would be transmitted simultaneously, rather than the same number of video segments for each respective program.

At the commencement of the next MRT interval the computer enters the scheduling algorithm program sequence noted above and schedules the data packets for the title requested as per the scheduling algorithm. The computer also appends the title ID and packet ID to each data packet. The computer then selects a free channel and routes the data packets to the corresponding modem for transmission to the requesting receivers. The head end computer follows this sequence of steps until all of the packets for the requested title have been transmitted since the time of the last request for this title. As soon as the computer has determined that all pending requests have been satisfied, no further data packets for that program are transmitted.

At the receiver, after the subscriber has sent a request the receiver scans the transmission channels and looks for the title ID. When the receiver finds the title ID it looks for the packet ID and stores any packets not already received in the buffer storage. If a packet has already been received this packet is discarded and the receiver continues to look for the remaining data packets until all the data packets for the video program have been received. Data packets stored in the buffer storage may be sent to the receiver directly for immediate viewing or stored for later viewing. Although non illustrated in FIG. 4, the receiver may also be configured to look for its unique address ID to provide a degree of security against unauthorised data reception.

From the above description of a preferred embodiment of the program transmission optimisation comprising a system and method of supplying video-on-demand it will be apparent that the scheduling algorithm employed provides an efficient means of transmitting a program to multiple requesting subscribers who can commence playback of the program within a specified maximum response time. It will be apparent to those skilled in the electronics, television and telecommunication arts that numerous modifications and alterations may be made to the program transmission optimisation system and method, other than those already described, without departing from the basic inventive concepts. For example, in alternative realisations of the system and method an optical fibre network may be employed for the distribution system, for example, to provide programming on demand for aircraft passengers. Furthermore, the system and method can operate using analog communications as well as digital, or a mixture of both. Although in the video-on-demand system described the video program segments are transmitted in compressed format, this is obviously not an essential feature of the invention, since significant improvements in transmission efficiency can be achieved by relying upon the scheduling algorithm alone. All such modifications and alterations are to be considered within the scope of the present invention the nature of which is to be determined from the foregoing description and the appended claims.

I claim:

1. A method for optimising transmission of a program to multiple receivers over a distribution system, wherein if one or more receivers request a particular program at a same time or different times, the distribution system responds to each request irrespective of whether or not a receiver other than said one or more receivers is already receiving the same particular program, while minimizing transmission resources required to service the requests, the method comprising:

at a head end of the distribution system,
- (a) providing the program divided into a plurality of program segments for implementing a scheduling algorithm by which the program segments are organized into a predetermined sequence; and
- (b) transmitting the program segments according to the scheduling algorithm such that during a time required for normal playback of the program at the multiple receivers, at least some of the program segments are transmitted more than once simultaneously from the head end to the multiple receivers with no requirement at any time to dedicate the head end of the distribution system to any specific receiver;

and at a receiver of the distribution system,
- (c) storing the transmitted program segments in a buffer storage means in the receiver for subsequent playback, wherein if a same program segment is received by the receiver more than once, said same program segment is stored only once in the buffer storage means, and wherein said scheduling algorithm ensures that any receiver will receive all of the program segments in a manner that will enable continuous playback of the program at a normal playback rate of the program while providing flexibility to structure the buffer storage means to be smaller than is required to hold the entire program if desired.

2. A method as claimed in claim 1, further comprising the step of selecting a Maximum Response Time (MRT) corresponding to a maximum time a user need wait to commence playing a requested program from a beginning of the program.

3. A method as claimed in claim 2, wherein step (a) comprises providing the program divided into program segments of a length selected such that at least one program segment is transmitted in the time of one MRT.

4. A method as claimed in claim 3, wherein step (b) comprises transmitting one or more program segments during each MRT, including a first program segment corresponding to a first segment of playing time of the program, in accordance with the scheduling algorithm, wherein, in use, the first program segment is always available at a receiver within one MRT for immediate playback.

5. A method as claimed in claim 4, further comprising at the head end of the distribution system the step of numbering the program segments 1 to n, where n equals the number of segments into which the program is divided, and wherein the segments are numbered in the order in which they should appear in the program for normal playback.

6. A method as claimed in claim 5, wherein implementing the scheduling algorithm involves iteratively calculating during each MRT the result of:

COUNT Modulo X=Y, wherein COUNT = a predetermined initial whole number incremented by 1 after each MRT;
X = 1 to n, where n = the number of segments into which the program has been divided; and
organizing the program segments into said predetermined sequence based on said calculation wherein, in use, whenever Y=0, the program segment number X will be transmitted.

7. A method as claimed in claim 1, further comprising the steps of recording a user identification number, a program title identification number and a time of each request in a subscriber request map; and tracking each request and its progress towards completion.

8. A system for optimizing transmission of a program to multiple receivers, wherein when one or more receivers request a particular program at a same time or different times, the system responds to each request irrespective of whether or not a receiver other than said one or more receivers is already receiving the same particular program, while minimizing transmission resources required to service the requests, the system comprising:

at a head end of the system:
means for providing the program divided into a plurality of program segments for implementing a scheduling algorithm by which the program segments are organized into a predetermined sequence; and,
means for transmitting the program segments according to the scheduling algorithm such that during a time required for normal playback of the program at the multiple receivers, at least some of the program segments are transmitted more than once simultaneously from the head end to the multiple receivers with no requirement at any time to dedicate the head end of the system to any specific receiver;

and at a receiver of the system,
buffer storage means for storing the transmitted program segments for subsequent playback on the receiver, wherein if a same program segment is received by the receiver more than once, said same program is stored only once in the buffer storage means, and wherein said scheduling algorithm ensures that any receiver will receive all of the program segments in a manner that will enable continuous playback of the program at a normal playback rate of the program while providing flexibility to structure the buffer storage means to be smaller than is required to hold the entire program if desired.

9. A system as claimed in claim 8, further comprising at the head end of the system:
means for numbering the program segments 1 to n, where n equals the number of program segments into which the program is divided, and wherein the program segments are numbered in the order in which they should appear in the program for normal playback, said means for numbering being operatively connected to said means for providing the program and said means for transmitting the program segments to provide for transmission of the program segments in accordance with the scheduling algorithm.

10. A system as claimed in claim 9, further comprising at the head end of the system:
means for appending a segment identifier to each program segment prior to transmitting, wherein said segment identifier at least identifies a program segment by its number, said means for appending a segment identifier being operatively connected to said means for numbering to determine a number assigned to each program segment for inclusion in said segment identifier.

11. A system as claimed in claim 8, wherein said means for transmitting transmits one or more of said program segments during each Maximum Response Time (MRT) time interval, wherein MRT corresponds to a maximum time a user need wait to commence playing a requested program.

12. A system as claimed in claim 11, further comprising scheduling means for scheduling said plurality of program segments, said scheduling means comprising:
    means for iteratively calculating during each MRT the result of the scheduling algorithm:

COUNT Modulo X=Y, wherein COUNT=a predetermined initial whole number incremented by 1 after each MRT;
    X=1 to n, where n=the number of segments into which the program has been divided; and
    means for organizing the program segments into said predetermined sequence based on said calculation wherein, in use, whenever Y=0, the program segment number X will be transmitted,
    and wherein said means for organizing is operatively connected to said means for transmitting the program segments to provide for transmission of the program segments in accordance with said result of said scheduling algorithm.

13. A receiver for receiving a program supplied to multiple receivers by a program transmission optimization system, wherein more than one of the multiple receivers request a particular program at a same time or different times, the system responds to each request irrespective of whether or not a receiver other than said more than one of the multiple receivers is already receiving the same particular program while minimizing transmission resources required to service the requests, the receiver comprising:
    buffer storage means for storing a plurality of program segments of the program transmitted from a head end of the program transmission optimization system according to a scheduling algorithm such that during a time required for normal playback of the program at the multiple receivers, at least some of the program segments are transmitted more than once simultaneously from the head end to the multiple receivers with no requirement at any time to dedicate the head end of the system to any specific receiver, and wherein if a same program segment is received by the receiver more than once, said same program segment is stored only once in the buffer storage means; and
    processing means for processing said program segments stored in the buffer storage means and for supplying the segments in a correct sequence for playback, wherein said scheduling algorithm ensures that the receiver will receive all of the program segments in a manner that will enable continuous playback of the program at a normal playback rate of the program while providing flexibility to structure the buffer storage means to be smaller than is required to hold the entire program if desired.

14. A receiver as claimed in claim 13, wherein said processing means comprises means for distinguishing received program segments by a segment identifier, wherein said segment identifier at least identifies a segment by its number and wherein, in use, the receiver uses the segment identifier to distinguish redundant segments from segments required for subsequent playback.

15. A receiver as claimed in claim 13, wherein said processing means further comprises decompressing means for decompressing compressed program segments transmitted from the head end of the program transmission optimization system.

16. A scheduling apparatus for a program transmission optimization system for optimizing transmission of a program from a head end to multiple receivers, wherein if one or more of the multiple receivers request a particular program at a same time or different times, the system responds to each request irrespective of whether or not a receiver other than said one or more of the multiple receivers is already receiving the same particular program, while minimizing transmission resources required to service the requests, the scheduling apparatus comprising:
    means for providing the program divided into a plurality of program segments for implementing a scheduling algorithm by which the program segments are organized into a predetermined sequence; and
    means for scheduling said plurality of program segments according to the scheduling algorithm such that during a time required for normal playback of the program at the multiple receivers at least some of the program segments are transmitted more than once simultaneously from the head end to the multiple receivers with no requirement at any time to dedicate the head end of the system to any specific receiver;
    and wherein said scheduled program segments are transmitted to one or more receivers of users requesting the program such that if a same program segment is received by a receiver more than once, said same program segment is stored only once in a buffer storage means provided in the receiver, and wherein said scheduling algorithm ensures that a user's receiver will receive all of the program segments in a manner that will enable continuous playback of the program at a normal playback rate of the program while providing the flexibility to structure the buffer storage means to be smaller than is required to hold the entire program if desired.

17. A scheduling apparatus as claimed in claim 16, wherein said means for providing the program provides the program divided into segments of a length selected such that at least one segment is transmitted in a Maximum Response Time (MRT) time interval, wherein the MRT corresponds to a maximum time a user need wait to commence playing a requested program from a beginning of the program.

18. A scheduling apparatus claimed in claim 17, further comprising means for numbering the program segments 1 to n, where n equals the number of segments into which the program is divided, and wherein the segments are numbered in the order in which they should appear in the program for normal playback.

19. A scheduling apparatus as claimed in claim 18, wherein said scheduling means comprises means for iteratively calculating during each MRT the result of the scheduling algorithm;

COUNT Modulo X=Y, wherein COUNT=a predetermined initial whole number incremented by 1 after each MRT:

X=1 to n, wherein n=the number of segments into which the program has been divided; and means for organizing the program segments into said predetermined sequence based on said calculation wherein, in use, whenever Y=0, the program segment number X will be transmitted.

20. An apparatus as claimed in claim 16, wherein said means for providing the program retrieves the program segments from a compressed program storage means wherein the program is stored in compressed segmented format corresponding to said plurality of segments.

21. A method as claimed in claim 1, wherein step (b) comprises transmitting program segments occurring early in the program more frequently than program segments occurring later in the program.

22. A method as claimed in claim 1, wherein step (b) comprises transmitting the plurality of program segments in accordance with a modified scheduling algorithm adapted to smooth a transmission load and to reduce transmission bandwidth requirements.

23. A method as claimed in claim 22, wherein the plurality of program segments comprises a first program segment, and wherein step (b) further comprises transmitting one or more initial program segments at predetermined time intervals for storing indefinitely in the buffer storage means in the receiver and transmitting the plurality of program segments except said one or more initial program segments in accordance with the modified scheduling algorithm, wherein in use, the first program segment is always available at the receiver for immediate viewing.

24. A method as claimed in claim 1, further comprising, prior to step (b), a step of compressing the program, wherein the plurality of program segments are provided in a compressed format.

* * * * *